June 15, 1965 | MASAHISA MIYAGI | 3,189,848

PARALLEL PUSHPULL HYBRID CIRCUIT

Filed Jan. 18, 1961 | 3 Sheets-Sheet 1

*Inventor*

M. Miyagi

*By* [signature]

*Attorney*

*Inventor*
M. Miyagi
*By* [signature]
*Attorney*

June 15, 1965 MASAHISA MIYAGI 3,189,848

PARALLEL PUSHPULL HYBRID CIRCUIT

Filed Jan. 18, 1961 3 Sheets-Sheet 3

Inventor
M. Miyagi
By R. P. Morris
Attorney

3,189,848
PARALLEL PUSHPULL HYBRID CIRCUIT

Masahisa Miyagi, Tokyo, Japan, assignor to Nippon Electric Company, Limited, Tokyo, Japan, a corporation of Japan Filed Jan. 18, 1961, Ser. No. 83,436
6 Claims. (Cl. 333—11)

The present invention relates to microwave transmission apparatus, and more particularly, is concerned with a pushpull hybrid circuit.

According to the present invention there is provided a parallel pushpull hybrid circuit for branching out or combining a plurality of signal waves in a parallel or pushpull manner, comprising a ring circuit consisting of a coaxial tube, or Lecher wires, or a waveguide. A terminal is installed to provide an input, output or resistance terminated terminal in the above-mentioned ring circuit. A pair of terminals are installed on opposite ends from said terminal on said ring circuit and are spaced one-quarter wavelength from the first-mentioned terminal. An odd number of pairs of terminals installed on said ring circuit are each spaced apart one-half wavelength, a terminal to provide either a resistance termination or an input or output termination is spaced one-quarter and three-quarter wavelengths respectively from the adjacent terminals, such that one or more sets of parallel pushpull signal branching outputs may be obtained at terminals other than the said two terminals to provide input, output or resistance terminated terminals, or a combined output of one or more parallel pushpull signal inputs applied to said terminals may be drived from the output terminal.

An object of the present invention is to provide a circuit much simpler in construction than conventional circuits and to reduce the change in the combined output signal level resulting from an unbalance of the input signals especially when the circuit is used as a combining circuit.

The above-mentioned and other features and objects of this invention and the manner of attaining will become more apparent and the invention itself will be best understood by reference to the following description of an embodiment of the invention taken in conjunction with the accompanying drawings wherein.

Figure 1:
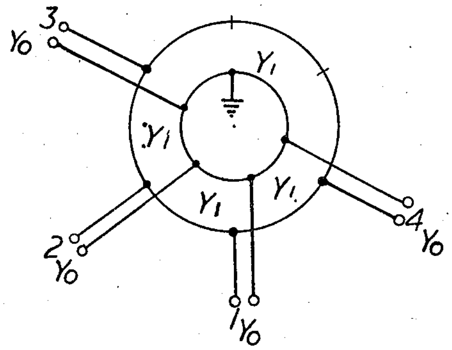
FIG. 1 shows the construction of an example of a conventional hybrid circuit used for branching or combining signal waves in a parallel or pushpull manner.

Referring to FIG. 1, let it be assumed that the characteristic admittance of the ring circuit be $Y_1$ and all characteristic admittances of the terminals, 1, 2, 3, and 4 be equal to $Y_0$, and further that the terminals be spaced apart as follows:

Terminals 3 and 4 should be spaced $\frac{3}{4}\gamma$ (wavelength), between terminals 1 and 2, 2and 3, and 1 and 4 there should be a space of $\frac{1}{4}\gamma$. As is well known, there is a relationship such that $Y_1=Y_0/\sqrt{2}$. Suppose that an input signal is applied to the terminal 2. Then the terminals 1 and 3 become parallel branching terminals, whereas the terminal 4 becomes a terminal for connecting thereto a terminating resistor. If an input signal is applied to the terminal 3, the terminals 2 and 4 provide pushpull branching terminals while the terminal 1 provides a terminal for connecting thereto a terminating resistor. If two input signals of the same amplitude and the same phase are applied to the terminals 2 and 4, the terminal 1 becomes a parallel combining terminal while 3 becomes a terminal for connecting a terminating resistor. Where input signals of the same amplitude, but differing 180 degrees in phase, are applied to the terminals 2 and 4, the terminal 3 becomes a pushpull combining terminal while terminal 1 becomes a terminal for connecting a terminating resistor.

Figure 2:
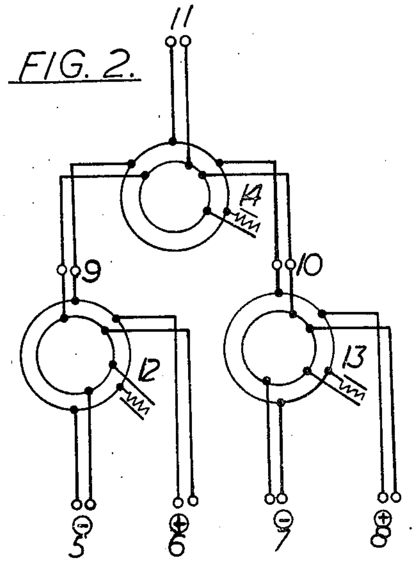
FIG. 2 shows the construction of an example of a parallel pushpull circuit using the above-mentioned conventional hybrid circuit.

Although a description has been made above in connection with the "rat-race" circuit that has been conventionally used, branching or combining signal waves in a parallel pushpull manner becomes possible if these "rat-race" circuits are used in combination as shown in FIG. 2. It is to be noted here that such combination has been used heretofore.

In a case where the combination of the "rat-race" circuit, as shown in FIG. 2, is used as a branching circuit, an input signal is applied to a terminal 11, whereby branched signals are obtained, in the same phase of terminals 6 and 8, and in the opposite phase at terminals 5 and 7, respectively. The power amplitudes of the obtained branch signals are a quarter of the input signal wave. Note that numerals 9 and 10 denote terminals for interconnecting the "rat-race" circuits while numerals 12, 13, and 14 denote terminating resistors.

On the other hand, in a case where the combination of the circuits are used to combine signal waves, two pairs of input signals of equal amplitudes are applied, one in one phase to the terminals 6 and 8, and the other in the opposite phase to the terminals 5 and 7, respectively. Then an output which is combined in a parallel pushpull manner is obtained at the terminal 11. In this case, it is noted that when the input signal to the terminal 5 for example, is caused to be suppressed, one half of the input signal at the terminal 6 is caused to be dissipated at the terminating resistor 12, where the signal level at the connection terminal 9 is lowered to one-quarter of that which otherwise is expected to be obtained. As a result, the signal level at terminal 9 becomes extremely unbalanced to that at the connection terminal 10, and the output level at the terminal 11 is extremely lowered.

It will be evident from such relations that the variation in the composite output level is liable to be produced unless the input signals are rigorously balanced.

Figure 3:
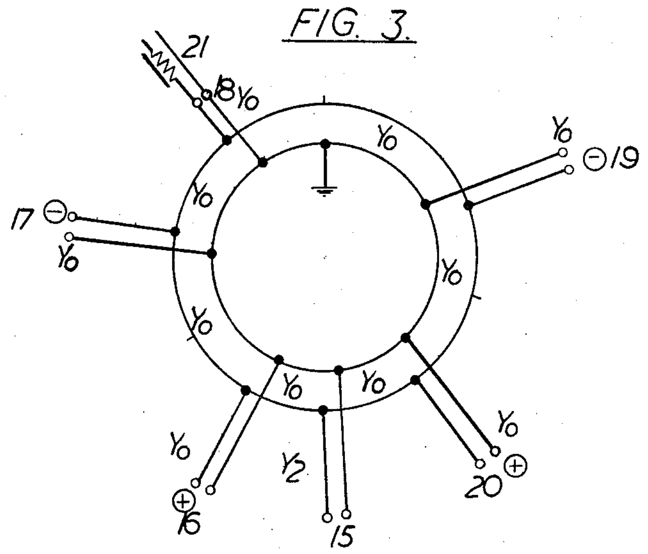
FIG. 3 shows the construction of an embodiment of the parallel pushpull circuit according to the present invention.

FIG. 3 shows one example of the construction of the parallel pushpull circuit in accordance with the present invention. In the drawing, the ring circuit consists of a coaxial tube or Lecher lines or a waveguide, the characteristic admittance of which is assumed to be $Y_0$. Reference numeral 15 denotes a terminal to be used as an input or output terminal while numerals 16, 17, 19 and 20 denote terminals to provide output or input terminals for parallel pushpull signals, and numeral 18 denotes a terminal to which a terminal resistor 21 is connected.

Let it be assumed that the characteristic admittance of each of the terminals 16, 17, 18, 19 and 20 be $Y_0$ and that of the terminal 15 be $Y_2$ and the lengths between the terminals 15 and 16, 15 and 20, 17 and 18 are respectively set to one-quarter wavelength. The terminals between 16 and 17, 19 and 20 are respectively set to one-half wavelengths, while that between the terminals 18 and 19 is set for three-quarter wavelength. In general, a transformer of one-quarter wavelength having the characteristic admittance $Y_2$ is added to the terminal 15 so that the input or output side load may be matched to the admittance $Y_0$.

At first, a description will be made referring to a case where the circuit is used as a parallel pushpull branching circuit. Upon applying, an input signal to terminal 15 as shown in FIG. 5(*a*), four equally divided branched outputs, two in phase at the terminals 16 and 20 and two in the opposite phase at the terminals 17 and 19, are available, whereas substantially no signal is wasted in the terminating resistor 21.

Figure 5:
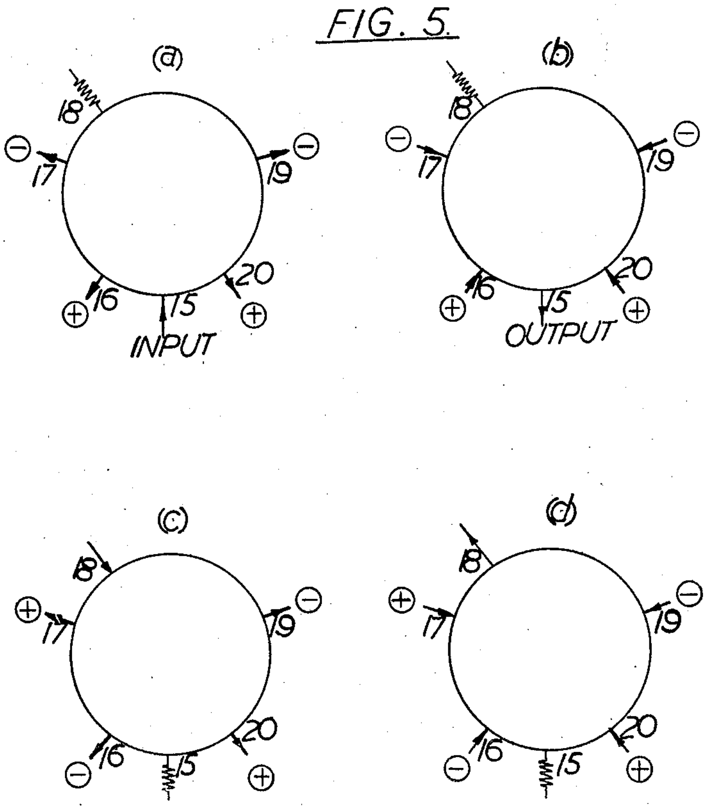
FIG. 5 shows various manners in which the parallel pushpull circuit according to the present invention operates.

Next, a description will be made referring to a case where the circuit is used as a parallel pushpull combining circuit. By applying four signal inputs of the same amplitude to the terminals 16, 20, and 17, 19, the former two in one phase while the latter two in the opposite phase, as shown in FIG. 5(*b*), an output combined in parallel pushpull manner is obtained at the terminal 15, whereas substantially no signal is wasted in the terminating resistor 21 where no unbalanced component is present.

Where the terminating resistor is connected to the terminal 15, the above-mentioned two operations become as shown at FIG. 5(*c*) and (*d*).

In a case where a pair of pushpull input signals is applied to the terminals 16 and 17 and each of the terminals 19 and 20 is terminated with the admittance $Y_0$, there is no substantial inputs entering into the terminals 19 and 20 while the composite output of almost equal amplitude is obtained at terminals 15 and 18.

In a similar manner, where a pair of pushpull input signals are applied to the terminals 19 and 20 terminated with the admittance $Y_0$, there is no substantial inputs entering into the terminals 16 and 17 and the composite outputs of approximately equal amplitude are obtained at terminals 15 and 18.

It will be understood that in the case where two sets of pushpull input signals differing 180 degrees in phase are applied to the terminals 16, 20, 17, 19 in such a manner that the former two input signals are in phase while the latter two input signals are in the opposite phase to each other, the output level at the terminal 15 is not decreased to less than one half of the normal value even if any composite signal input may be caused to be absent. Thus the degree to which the composite output is affected by the unbalance among the component input signals has been reduced to less than about 2 db as compared with the case of FIG. 2. This shows at the same time that the level of the signal entering into and wasted at the terminating resistor 21 has been decreased as compared with a case illustrated in FIG. 2, the effect being particularly pronounced where the circuit is used for a high power amplifier circuit.

Figure 4:
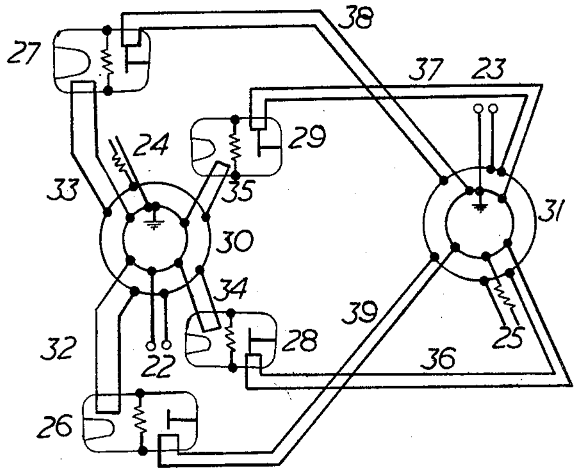
FIG. 4 shows the construction of an example of the present invention as applied to a parallel pushpull amplifier circuit.

FIG. 4 shows a diagram illustrating the principle of operation of the parallel pushpull hybrid circuit according to the present invention as applied to a pushpull amplifier circuit. Numeral 22 denotes a signal input terminal, 23 a signal output terminal, 24 and 25 terminating resistors, 26, 27, 28, and 29 vacuum-tube type amplifiers, 30 and 31 the parallel pushpull hybrid circuits according to the present invention. The input and output side connections are denoted by reference characters 32, 33, 34, 35 and 36, 37, 38, 39, respectively. The input and output connections, resonant cavity, for example, of the vacuum tubes 26, 27, 28, and 29 are simplified in FIG. 4.

Provided that no unbalance in amplitude or phase is produced by the input side connections 32, 33, 34, and 35, a pushpull input signal is applied to each of the vacuum-tube amplifiers 26, 27, 28, and 29, thereby performing the parallel pushpull operation.

Provided that the gains of the vacuum-tube amplifiers and the phase rotation amounts within the tubes are equal, the amplitudes of the output signals from the vacuum-tube amplifiers become equal, the phase differing by 180 degrees. Provided that no unbalance is produced in amplitude and phase by the output side connections 36, 37, 38, and 39, the vacuum-tube amplifier output signals are combined by the parallel pushpull hybrid circuit 31 so as to be derived from the signal output terminal 23, thereby performing the ideal, stabilized parallel pushpull operation.

The parallel pushpull hybrid circuit according to the present invention can find an application, for example, in a high power parallel pushpull amplifier, enabling a stabilized composite output to be drived and the resistance values of the terminating resistors to become comparatively small as the conspicuous features. Since the construction is also extremely simplified, the parallel pushpull operation of several sets of transmitters can be performed with ease.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A parallel pushpull hybrid circuit consisting essentially of a ring circuit composed of signal transmission means, a first terminal connected to said ring circuit, a pair of second terminals and a pair of third terminals all connected to said ring circuit, each of said second terminals being located at each side of said first terminal and spaced therefrom along said ring circuit by a quarter wavelength of the signal in said ring circuit, each of said third terminals being located more remote from said first terminal than the second terminal and spaced from the second terminal along said ring circuit by half wavelength of said signal, a fourth terminal also connected to said ring circuit, said fourth terminal being located between said third terminals and spaced along said ring circuit from one of them by a quarter wavelength and from the other of said third terminals by substantially three quarters of the wavelength of said signal, one of said first and fourth terminals, being terminated by a terminating resistor.

2. A parallel pushpull hybrid circuit as claimed in claim 1, for branching out an input signal wherein the input signal is applied to that one of said first and fourth terminals which is not terminated by a terminating resistor whereby branched output signals are obtained at said second and third terminals.

3. A parallel pushpull hybrid circuit as claimed in claim 1, for combining signals in parallel pushpull manner wherein two pairs of the signals are applied, one in the one phase and the other in the opposite phase, to said second and third terminals, whereby a combined output signal is obtained at that one of said first and fourth terminals which is not terminated by a terminating resistor.

4. A parallel pushpull hybrid circuit as claimed in claim 1, wherein said transmission means is a coaxial tube.

5. A parallel pushpull hybrid circuit as claimed in claim 1, wherein said transmission means are Lecher lines.

6. A parallel pushpull hybrid circuit as claimed in claime 1, wherein said transmission means is a waveguide.

References Cited in the file of this patent

UNITED STATES PATENTS

| | | |
|---|---|---|
| 2,445,895 | Tyrrell | July 27, 1948 |
| 2,784,381 | Budenbom | Mar. 5, 1957 |

OTHER REFERENCES

Tyrrell: "Hybrid Circuits for Microwaves," IRE Proceedings 35, 1294–1306, Nov. 1947.

Miyagi: "Parallel P7sh Pull Hybrid Circuit," IRE Transactions on Microwaves Theory and Practice, MTT-10:34–40, January 1962.